Nov. 7, 1967   F. G. FREEMAN   3,351,098
HYDRAULIC ACCUMULATOR
Filed Nov. 23, 1965
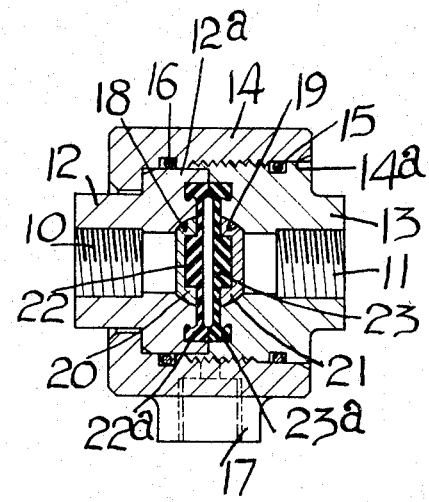

United States Patent Office 3,351,098
Patented Nov. 7, 1967

3,351,098
HYDRAULIC ACCUMULATOR
Frank George Freeman, Solihull, England, assignor to Joseph Lucas (Industries) Limited, Birmingham, England
Filed Nov. 23, 1965, Ser. No. 509,324
Claims priority, application Great Britain, Nov. 30, 1964, 48,490/64
1 Claim. (Cl. 138—30)

This invention relates to hydraulic accumulators of the kind comprising a body defining a pair of fluid inlet passages, a deformable bag disposed within the body between closed ends of the pair of inlet passages, said bag being, in use, filled with a gas.

It has been found that, with conventional constructions, in which the bag is pre-filled with gas before being installed within the body, there is a tendency for leakage to occur, and since this cannot readily be made good, the performance of the accumulator is impaired.

The object of this invention is to provide an hydraulic accumulator of the kind specified, in a form in which this disadvantage is minimised.

According to the present invention an hydraulic accumulator of the kind specified is characterised in that the deformable bag has an inlet through which a gas under pressure can be introduced, the body being provided with two parts which are capable of being relatively separated to a limited extent, the parts when in respective predetermined relatively separated positions, permitting access of gas to the inlet of the bag, and when in respective clamping positions precluding such access by closing said inlet, there being sealing means on said parts of the body respectively for preventing escape of gas other than into said bag when the parts are in said predetermined relatively separated positions.

A specific example of the invention is illustrated in the accompanying drawing which is a cross-sectional side elevation view of an hydraulic accumulator constructed in accordance with this invention.

In this example the hydraulic accumulator comprises a body having a pair of oppositely directed inlets 10, 11 formed respectively in a pair of externally stopped tubular parts 12, 13. One of these parts 13 has an external screw-thread which is engaged by a sleeve 14 having an inwardly extending flange at one end engaging with the step on the part 12. Between the free end of the sleeve 14 and its internally screw-threaded portion is a plain cylindrical portion 14a against which a sealing ring 15, carried in a groove in the adjacent tubular part 13 seats.

Near the inwardly extending flange of the sleeve 14 is a groove which accommodates a further sealing ring 16, engaging with a plain external cylindrical surface 12a on the adjacent tubular part 12. The sleeve 14 further has a radially outwardly extending internally screw-threaded boss 17 adapted for connection to a source of gas under pressure, such as air. Inside the two tubular parts 12, 13 at their adjacent ends, are respective part spherical seatings 18, 19 against which a pair of complementary members 20, 21 seat respectively. Between these members 20, 21 is a deformable bag formed as two dished parts 22, 23 of rubber or other suitable flexible material.

These parts 22, 23 forming the bag having respective lips 22a, 23a which engage in respective recesses in the tubular parts 12, 13. The depth of these lips 22a, 23a is such, however, that when in use the tubular parts 12, 13, are clamped in face to face relationship, the lips are compressed to seal the interior of the bag against leakage.

To fill the bag with a gas under pressure, either initially or when leakage has necessitated this, the tubular parts 12, 13 of the body are separated to a limited extent by screwing the tubular part 13 partially out of the sleeve 14 so that the lips 22a, 23a of the parts 22, 23 of the bag separate to form an inlet, and the space between the two tubular parts 12, 13 affords access of gas from the boss 17 on the sleeve 14 to the inlet of the bag. The sealing rings 15, 16 serve to prevent escape of gas other than into the bag. When the bag has been pressurised to a desired degree, the tubular parts 12, 13 of the body are clamped together by screwing the tubular part 13 into the sleeve 14 thus sealing the bag inlet. This operation is carried out without relieving the gas pressure, the connector to the boss 17 for supplying gas only being removed when the bag has been satisfactorily sealed.

The accumulator described, having two inlets 10, 11 is particularly useful for insertion between two hydraulic lines, the accumulator being capable of operating which ever of the lines is at a higher pressure.

Having thus described my invention what I claim as new and desire to secure by Letters Patent is:

An hydraulic accumulator of the kind comprising a body defining a pair of fluid inlet passages, a deformable bag disposed within the body between closed ends of the pair of inlet passages, said bag being, in use, filled with a gas, the deformable bag having an inlet through which a gas under pressure can be introduced, the body being provided with two parts which are capable of being relatively separated to a limited extent, the parts when in respective predetermined relatively separated positions, permitting access of gas to the inlet of the bag, and when in respective clamping positions precluding such access by closing said inlet, there being sealing means on said parts of the body respectively for preventing escape of gas other than into said bag when the parts are in said predetermined relatively separated positions.

References Cited

UNITED STATES PATENTS

| 2,246,621 | 6/1941 | Davis. | |
| 2,501,773 | 3/1950 | Johnson | 138—30 |
| 2,540,676 | 2/1951 | Johnson et al. | 138—30 |
| 2,805,684 | 9/1957 | Love | 138—30 |

FOREIGN PATENTS

| 877,800 | 9/1961 | Great Britian | 138—30 |
| 305,410 | 2/1933 | Italy | 138—26 |

LAVERNE D. GEIGER, Primary Examiner.
B. KILE, Assistant Examiner.